W. ATKINS.
WAGON TRAIN.
APPLICATION FILED SEPT. 19, 1910.
1,122,241.
Patented Dec. 29, 1914.
3 SHEETS—SHEET 3.
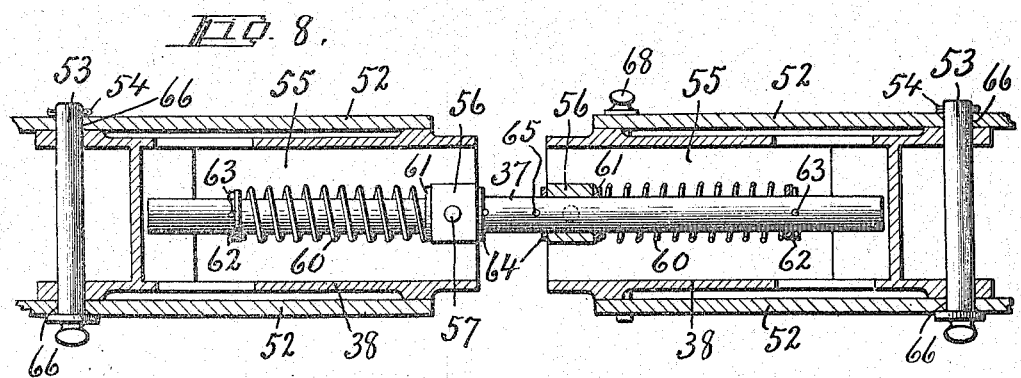
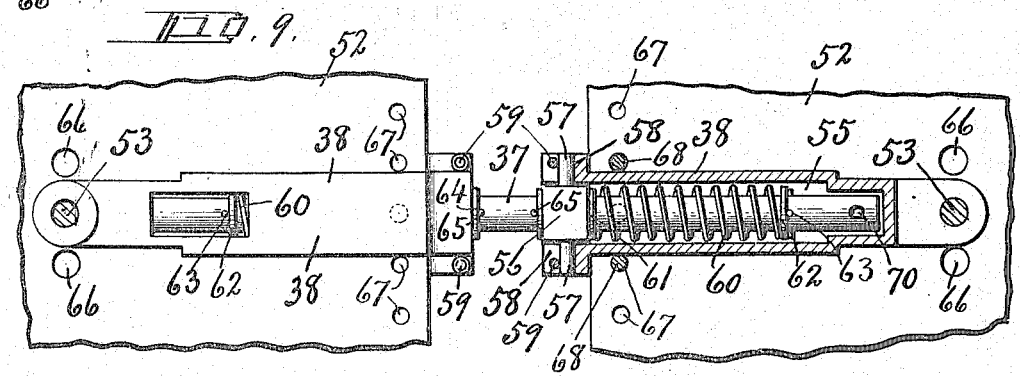
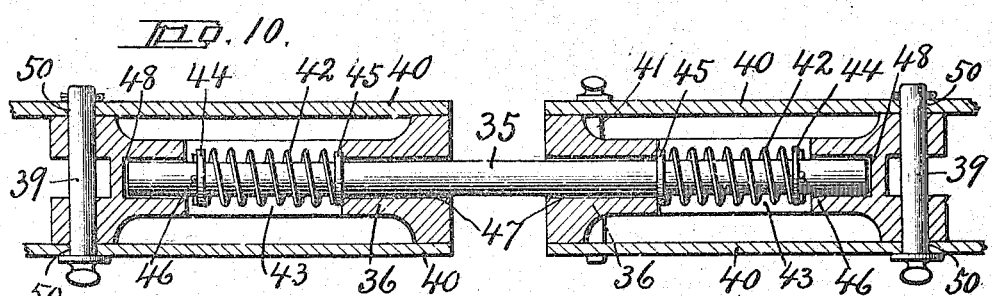
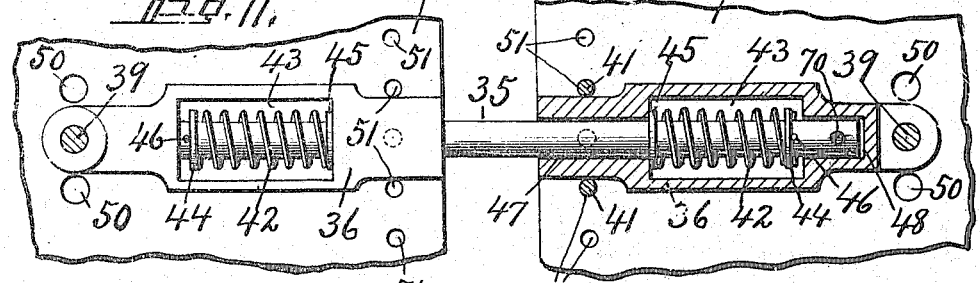
WITNESSES
E. J. Stark
H. E. Chase
INVENTOR.
Wm Atkins
BY
Howard P. Denison
ATTORNEY.

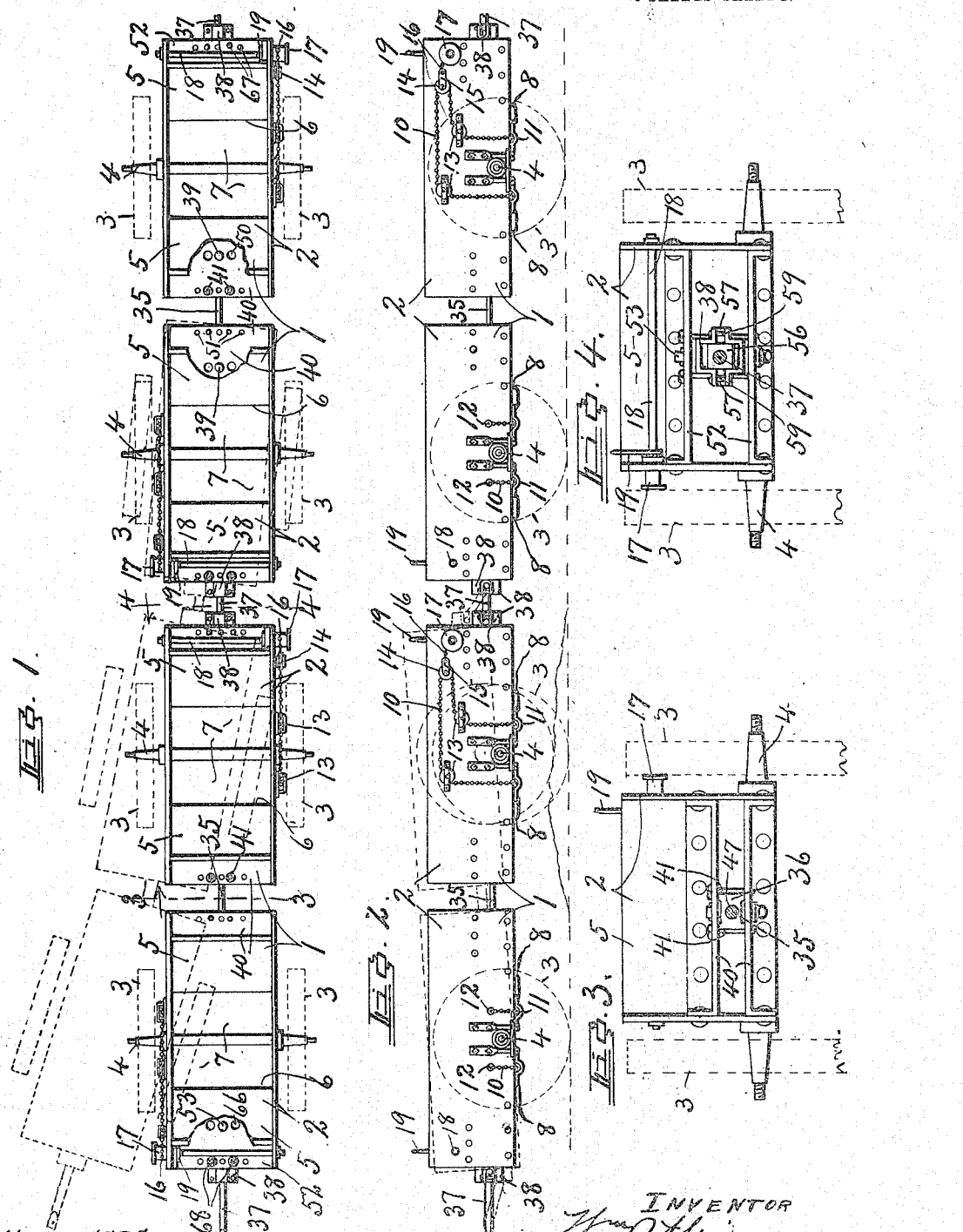

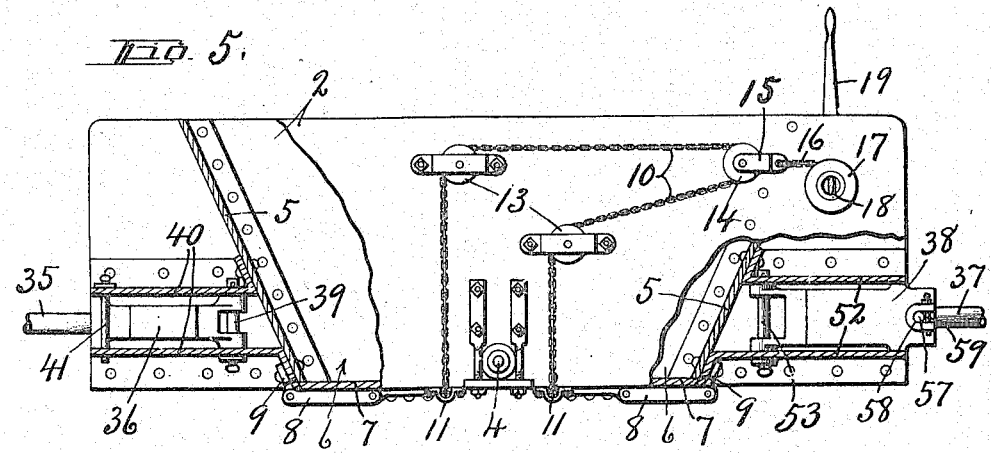
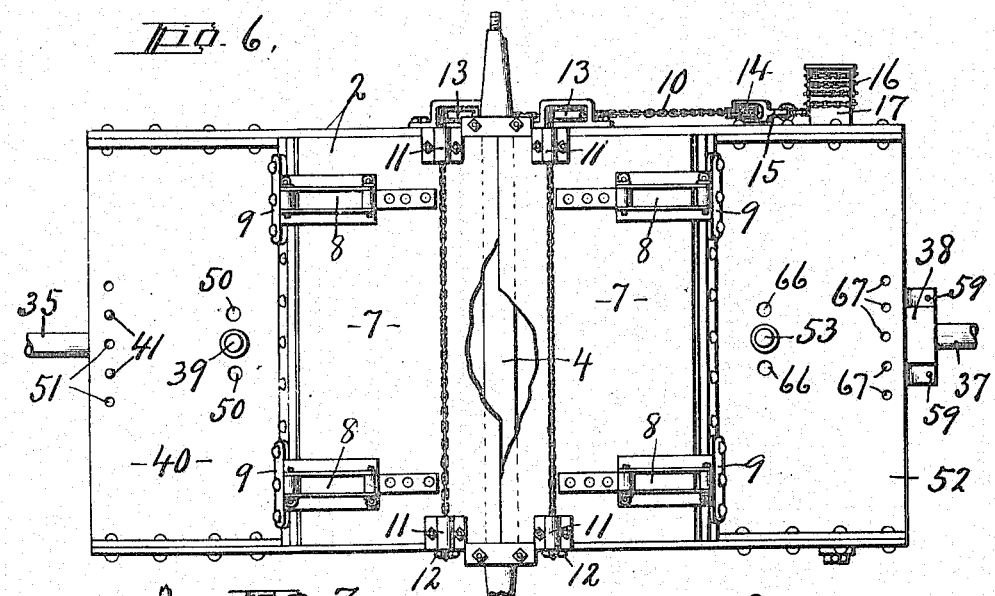

UNITED STATES PATENT OFFICE.

WILLIAM ATKINS, OF AUBURN, NEW YORK, ASSIGNOR, BY DIRECT AND MESNE ASSIGNMENTS, OF THREE-FOURTHS TO ELMORE N. ROSS AND WILLIAM A. TICE, BOTH OF AUBURN, NEW YORK.

WAGON-TRAIN.

REISSUED 1,122,241.

Specification of Letters Patent. Patented Dec. 29, 1914.

Application filed September 19, 1910. Serial No. 582,678.

*To all whom it may concern:*

Be it known that I, WILLIAM ATKINS, of Auburn, in the county of Cayuga, in the State of New York, have invented new and useful Improvements in Wagon-Trains, of which the following, taken in connection with the accompanying drawings, is a full, clear, and exact description.

This invention relates to certain improvements in wagon trains, and although it refers more particularly to two-wheeled dump wagons of the bottom dump type to be used in train in the construction of highways, and other road beds, it is evident that the main features of the invention are clearly applicable to other forms of wagons and that the combined elements forming the subject matter of this invention may be employed for other purposes.

In the construction of high-ways, road beds, canals and other similar projects in which extensive excavations and fills are required, the conveniences for loading and hauling materials used in such projects vary considerably along the line or at different localities so that in some places, it will be possible to operate a train of two-wheeled wagons or carts by means of a traction-engine or other mechanical or animal power, while in other places it would be impracticable to operate more than a single two-wheeled cart by the same or different power. Furthermore, in this class of work where the wagons are necessarily drawn over extremely uneven surfaces in and for which four-wheeled dump wagons are now most commonly employed, the running gear as well as the box or body is frequently subjected to excessive strains, thereby resulting in unavoidable breakage and incurring a large expense for repairs and replacement of the wagon.

The main object of my invention is to obviate so far as practicable, the difficulties attending the use of the ordinary dump wagon by constructing a four-wheeled wagon in two-wheeled sections or carts and connecting such sections together in such manner as to permit a wide range of flexibility or independent movement of either section relatively to the other.

A further object is to provide means whereby the sections or wagons may be coupled together indefinitely for use as a train drawn by a single motive power as for example, a traction engine, whereby the sections may be readily uncoupled and used independently in connection with the same or a different motive power.

Another object is to enable the coupling or draw-heads between the adjacent ends of the wagon sections to be pivoted for lateral swinging movement or fixed against such movement at either end and thereby allow the leading sections to turn and thus determine the line of travel of the succeeding sections. In other words, I have sought to provide for the adjustment of the draw-heads in such manner that one or a series of the wagons or sections may be drawn from either end, and also to provide for the relative transverse tilting of said sections and for the vertical tilting movement of the coupled wagons.

Other objects and uses relating to the couplings and also to the mechanism for controlling the operation of the bottom doors will be brought out in the following description.

In the drawings, Figures —1— and —2— are respectively a top plan and a side elevation of a wagon train comprising in this instance two wagons or four cart sections embodying the various features of my invention. Figs. —3— and —4— are transverse sectional views taken respectively on lines 3—3 and 4—4, Fig. —1—, showing opposite ends of the same wagon section and the proper forms of couplings connected thereto. Fig. —5— is a side elevation, partly in section, of one of the wagon boxes showing the couplings and door operating mechanism. Figs. —6— and —7— are, respectively, an inverted plan and an opposite side elevation of the same box. Fig. —8— is an enlarged longitudinal vertical sectional view, partly in elevation, of the couplings between the wagon sections. Fig. —9— is a top plan, partly in section, of the couplings shown in Fig. —8—. Fig. —10— is an enlarged longitudinal sectional view, partly in elevation, of the couplings between the wagons. Fig. —11— is a top plan, partly in section of the same coupling shown in Fig. —10—.

In order that my invention may be clearly understood, I have shown in Figs. —1— and —2— a plurality of, in this instance, two four-wheeled wagons —1—, each comprising two bottom dump boxes or bodies —2— centrally mounted upon a pair of suitable wheels as —3— which are shown by dotted lines. Each wagon section is adapted to be used individually or independently of the others and for this purpose each dump box —2— is centrally supported upon an axle —4—, extending transversely of and under the box and supported in suitable hangers on the sides thereof, said box having downwardly and inwardly inclined ends —5—, the lower edges of which are disposed in substantially the same plane as, and the same distance from the axle —4— forming intervening openings —6— which extend from side to side of the box. These openings are adapted to be closed by separately movable doors —7— corresponding in area to that of their respective openings, each door being hingedly supported substantially midway between its front and rear edges upon one or more forwardly and rearwardly extending hinge bars —8— which are pivoted at their outer ends to fixed hinge sections —9— on the inclined ends of the box so that the axes of the doors and their movable supporting bars —8— are substantially parallel and extend transversely of the box in such manner as to effectively close the opening and permit independent, swinging motion of the doors upon the supporting bars —8— when said doors are opened. The object of this independent movement of the doors is to permit them to more readily clear themselves from the discharged load or other obstacles as the wagon or train is moving. The doors —7— are of sufficient length from front to rear to extend along the lower edges of the inclined ends —5— and axle —4— when in their closed position and under such conditions are tightly drawn against said lower edges or faces by their operating mechanisms, presently described, thereby reducing the liability of accumulations of dirt or other foreign matter at the joints which might interfere with the positive closing of the doors.

Each box or section —2— is equipped with a separate door controlling mechanism consisting in this instance of a single chain or cable —10— having its ends extended transversely under the inner edges of the doors through suitable guides —11— and secured by hooks or similar fastening means —12— to the outer face of one side of the box as best seen in Fig. —7—, the intermediate portions of said chain being passed around idlers —13— on the opposite side of the box and around a suitable sheave —14— at the same side. This sheave 14 is mounted in a yoke —15— which is connected by a separate cable —16— to a rotary drum —17—. The drum —17— is secured to the outer end of a rotary tubular shaft —18— which extends transversely of and is journaled in suitable bearings in the sides of the box just outside of one of the ends.

Either of the wagon sections or carts may be used individually but when used in train, the sections of each wagon are coupled together by a draw-rod —35— and opposite draw-heads —36— as best seen in Fig. —10—, while the wagons which comprise two of the sections are coupled together end to end by draw-bolts —37— and opposite draw-heads —38—, as best seen in Figs. —8— and —9—.

One end of each wagon section of the cart is equipped with one of the draw-heads —36— and corresponding draw-rod —35— while the opposite end of the same cart is equipped with one of the draw-heads —38— and its corresponding draw-bar —37—. Each draw-head —36— is connected at its inner end by a pivotal bolt —39— to and between lower and upper horizontal guide plates —40— which are rigidly secured to the adjacent end of the dump box to permit the dump box and draw-head to swing laterally relatively to each other, and at the same time the plates —40— serve to prevent relative vertical movement of the guide plates and draw-head. When the cart sections are connected in train, this relative lateral swinging movement is only permitted between the rear end of the leading cart and corresponding draw-head. The draw-head —36— on the forward end of the succeeding cart is locked against lateral swinging movement relative to its guide plates —40— by means of one or more, in this instance two, stop pins —41— which are passed vertically through registering apertures in the plates —40— and in close proximity to opposite sides of the outer end of the draw-head when the draw-head is centrally positioned or parallel with the lengthwise center of the box as best seen at the right of Fig. —11—. Each end of the draw-rod —35— is yieldingly connected for relative lengthwise movement to one of the draw-heads —36— by means of a coiled spring —42— which in this instance is arranged in a central opening —43— in the draw-head and is interposed between suitable shoulders or washers —44— and —45— surrounding the adjacent portion of the draw-rod. The washer —45— abuts against one end of the opening —43— while the washer —44— is spring-pressed by the spring —42— against a limiting stop —46— on the draw-rod. This draw-rod is slidable endwise in a corresponding opening —47— extending inwardly from the outer end thereof to a point in proximity to the pivotal bolt —39— where it terminates against an abutment —48— normally engaged by the corresponding end of the draw-rod —35— to limit the endwise movement of said draw-rod in that direction. The opening —47— is of substantially the same cross section form and size as the draw-rod —35—, leaving just sufficient clearance to permit the latter to slide freely therein. It therefore follows that when the wagon sections are connected in train the ends of the sections of each wagon are prevented from relative vertical movement but at the same time the leading wagon section is allowed to rock laterally upon the pivotal bolt —39— while the section immediately following is held against such lateral swinging movement by the pins —41—, thus permitting the leading cart of each wagon to serve as a steering section for the succeeding section.

In some instances it is impracticable or inadvisable to turn the entire train around end for end, under which conditions the motive power, such as a traction engine, may be detached from the previously fastened end and connected to the opposite end of the train, whereupon it is simply necessary to remove the pins —41— from the plates —40— in which they were previously placed and to replace them in the corresponding apertures of the plates —40— of the adjacent cart which then becomes the follower.

In some instances it may be desired to remove the draw-heads to permit them to be used in connection with other wagon sections and for this purpose the pivotal bolts —39— are removable, being held in place by cotter-keys or equivalent detachable fastening means. When the draw-heads are removed from between the plates —40— they may be readily detached from the draw-rods —35— by simply removing the stop pins —46— through the opening —43—, thus permitting the rod —35— to be withdrawn from the draw heads —36— and washers —44— and —45— and spring —42— and allowing the corresponding end of the draw-rod to be attached to a traction engine or other motor power.

In some instances as in the construction or surfacing of highways, it may be desirable to utilize the wheels for rolling as large surface area as possible by shifting one or more of the carts out of alinement with the others and for this purpose the platforms or plates —40— are provided with a transverse row of two or more, in this instance three, bolt openings —50— for the reception of the pivotal bolt —30—, said platform being also provided with a plurality of sets of apertures —51— for the reception of the stop pins —41—, thus permitting either draw head —36— to be shifted laterally to different positions from the longitudinal center of the box and thereby causing the wheels of adjacent wagon sections to travel side by side in different paths for the purpose of rolling a greater surface area as the wagon or train is drawn in one diection or the other.

Each of the draw-heads —38— is adapted to swing or rock laterally between horizontal guide plates —52— in a manner similar to the draw-heads —36— and for this purpose the inner end is connected to the plates —52— by a pivotal bolt —53— which is passed through a set of registering bolt openings therein and is held in place by a cotter-key —54— so that the pivotal bolt may be removed to permit the removal of the draw-head when desired or necessary. These plates —52— are secured to the end of the wagon box or section —2— opposite that to which the plates —40— are secured but are spaced apart vertically a greater distance than the plates —40— to permit vertical rocking movement of the corresponding end of the draw-rod —37— therein as will be hereinafter described, the outer end of each draw-head being fitted with an easy sliding fit between the plates —52— to prevent relative vertical movement of said plates and draw-head. These draw-heads —38— are provided with central lengthwise openings —55— of greater vertical height at the inner ends than the diameter of the draw-bar to thereby allow the corresponding wagon sections to tilt endwise vertically relatively to each other, the transverse width of the openings being just sufficient to permit the free vertical rocking movement of the heads and rods relatively to each other and preventing relative lateral movement of the same parts.

When the wagons are connected together in train, the draw-bars —37— extend centrally through the openings —55— to points in proximity to the pivotal bolts —53— and play between the lower and upper sides of the inner ends of the draw heads, which sides are spaced apart vertically for this purpose. This draw-bar is preferably round in cross section and is journaled in a suitable rock shaft or cross head —56— having opposite laterally projecting trunnions or journals —57— which are journaled in bearings —58— in the adjacent ends of the sides of the draw-heads and are held in place by removable pins —59—, the latter being passed through registering apertures in opposite sides of the bearing —58— to prevent withdrawal of the rock shaft from the draw-head through the open side of the bearing, and at the same time permitting the same rock shaft to be removed when necessary by simply removing the pins —59. These rock shafts —56— are therefore journaled in the adjacent open ends of the draw-heads —38— to permit relative endwise tilting of the draw-heads and carriages upon which they are mounted, under which conditions the inner ends of the draw-rods play vertically in the openings —55—. It is also apparent that by journaling the draw-rod —37— in the rock shafts or cross heads —56—, the carriages upon which said draw-heads are mounted may also rock or tilt transversely relatively to each other, the same being also true of the carriages which are connected by the draw-rod —35— and draw-heads —36—.

The draw-bar —37— and its corresponding draw-heads —38— are yieldingly connected for relative endwise movement by coiled springs —60— which encircle the opposite ends of the draw-rod between limiting stops —61— and —62— consisting in this instance of washers which are loosely mounted upon the draw-rod. The washer —61— is held against the inner face of the rock shaft or cross-head —56— by the adjacent end of the spring —60—, while the washer —62— is held against a stop pin —63— by the adjacent end of the same spring which therefore tends to force the draw-rod endwise inwardly but such movement is limited by a stop shoulder consisting of a washer —64— which normally engages the outer end face of the rock shaft or cross-head —56— and is held in position by a stop pin —65— as best seen in Figs. —8— and —9—.

It is now clear from the foregoing description that the draw-rod and rock shafts are free to turn and to move endwise relatively to each other with or against the action of the springs —60— which latter serve as shock absorbers or buffers to prevent sudden jerks or excessive strains upon the connections between the wagons or wagon sections when starting or in transit from one place to another, the same also being true of the springs —42— between the draw-rod —35— and their corresponding draw-heads —36—.

In order that the wagons or wagon sections which are coupled together by the draw-rod —37— and draw-heads —38— may be shifted laterally relatively to each other to cause their wheels to travel out of alinement for the purpose of rolling a greater area of road surface, the plates —52— are provided with a transverse series of in this instance three apertures —66— for the reception of the pivotal bolt —53—, said plates being also provided with a plurality of sets of apertures —67— for the reception of locking pins —68— by which the corresponding draw-head may be locked against a lateral swinging movement upon the corresponding pivotal bolt —53— as best seen at the right of Figs. —8— and —9—. These pins —68— serve the same purpose in connection with the draw-heads —38— as the pins —41— for the draw-heads —36— and when the carriages are connected in train, the locking pins are only inserted in the front end of each succeeding carriage, leaving the rear end of the preceding carriage and its draw-head free to rock relatively to each other, whereby each preceding carriage serves to steer or guide the next succeeding carriage. Like the draw-heads —36—, the draw-heads —38— may be readily removed from between the plates —52— by simply removing the pivotal bolt —53—, while the draw-bars —37— may be also readily removed from the draw-heads by simply removing the pins —59—, thus permitting quick removal of the springs —60— and washers —61— and —62— by withdrawing the pin —63—. In this manner either of the carriages may be detached from the corresponding end of the draw-bar which end is equipped with means as an aperture —70— for receiving a suitable bolt or pin by which it may be readily attached to a traction engine or other motive power.

What I claim is:—

1. A wagon train composed of two-wheel cars, each car having its opposite ends provided with separate pairs of opposed plates, hollow draw-heads pivoted to and between their respective pairs of plates, draw bars extending into their respective draw heads and a rocking member journaled in one of the draw bars and pivotally connected to the corresponding draw head.

2. A wagon train having the opposite ends of each of its units provided with separate pairs of fixed plates spaced apart vertically, hollow draw heads pivoted at one end to and between their respective pairs of plates, draw bars extending into their respective draw heads and a rocking member journaled on one of the draw bars and pivoted to the corresponding draw head to swing in a plane at right angles to that of such draw head.

3. A wagon train having the opposite ends of each of its units provided with an axle and a dump box centrally mounted upon the axle, separate draw heads pivoted to opposite ends of the apex, and separate draw bars connected to their respective draw heads for relative rotary movement, one of said draw bars being pivoted to its draw head for independent rocking movement.

4. A wagon train having the opposite ends of each of its units provided with an axle and a dump box centrally mounted upon the axle, separate draw heads pivoted to opposite ends of the apex, separate draw bars connected to their respective draw heads for relative rotary movement, one of said draw bars being pivoted to its draw head for independent rocking movement, and means for holding the other draw bar against rocking movement relatively to its draw head.

5. A wheel-carriage having its opposite ends provided with laterally swinging draw-heads, separate draw-bars rotatable in said draw-heads, means for holding one of the draw-heads and its corresponding draw-bar against relative vertical movement, and a rocking connection between the other draw-head and its corresponding draw-bar.

6. A wheel-carriage having its opposite ends provided with laterally swinging draw-heads and separate draw-bars slidable endwise in the draw-heads, each draw-head and its draw-bar being rotatable one upon the other, a rocking support journaled on one of the draw-heads and provided with an opening in which the adjacent draw-bar is slidable, yielding connections between said draw-bar and support, separate yielding connections between the other draw-head and its corresponding draw-bar, said yielding connections acting in the direction of length of said draw-bars.

7. A wagon train having each of its units provided with an axle and a bottom-dump dump box centrally secured thereto, a draw head pivoted at one end to one end of the dump box, a cross head journaled on the opposite end of the draw head and provided with an opening therethrough, a draw bar extending through said opening and yielding connections between the draw bar and cross head.

In witness whereof I have hereunto set my hand on this 6th day of September 1910.

WILLIAM ATKINS.

Witnesses:
 H. E. CHASE,
 E. F. SPEARING.